US009015705B2

(12) United States Patent
Hoehle et al.

(10) Patent No.: US 9,015,705 B2
(45) Date of Patent: Apr. 21, 2015

(54) COMPUTING DEVICE HAVING A MIGRATED VIRTUAL MACHINE ACCESSING PHYSICAL STORAGE SPACE ON ANOTHER COMPUTING DEVICE

(75) Inventors: Marco Hoehle, Affoltern an Albis (CH); Christian Kirsch, Hamburg (GE); Andreas Schmengler, Meckenheim (GE); Stephan Schwarzer, Hamburg (GE)

(73) Assignee: International Business Machines Corporation, Armonk, NY (US)

( * ) Notice: Subject to any disclaimer, the term of this patent is extended or adjusted under 35 U.S.C. 154(b) by 1556 days.

(21) Appl. No.: 12/339,180

(22) Filed: Dec. 19, 2008

(65) Prior Publication Data

US 2009/0249332 A1 Oct. 1, 2009

(30) Foreign Application Priority Data

Mar. 28, 2008 (EP) .................................... 08153484

(51) Int. Cl.
*G06F 9/455* (2006.01)

(52) U.S. Cl.
CPC .... *G06F 9/45558* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 6,549,968 B1 * | 4/2003 | Hart | ............................. | 710/303 |
| 7,484,208 B1 * | 1/2009 | Nelson | ............................. | 718/1 |
| 2005/0193188 A1 * | 9/2005 | Huang | ............................. | 713/1 |
| 2005/0204013 A1 * | 9/2005 | Raghunath et al. | ............ | 709/217 |
| 2005/0235045 A1 * | 10/2005 | Narayanaswami et al. | ... | 709/217 |
| 2005/0268298 A1 * | 12/2005 | Hunt et al. | ........................ | 718/1 |
| 2006/0005189 A1 * | 1/2006 | Vega et al. | ........................ | 718/1 |
| 2006/0089995 A1 * | 4/2006 | Kerr et al. | ..................... | 709/227 |
| 2007/0220121 A1 * | 9/2007 | Suwarna | ....................... | 709/220 |
| 2008/0104587 A1 * | 5/2008 | Magenheimer et al. | ........... | 718/1 |
| 2008/0270564 A1 * | 10/2008 | Rangegowda et al. | ........ | 709/212 |
| 2010/0082922 A1 * | 4/2010 | George et al. | ................. | 711/162 |
| 2012/0017031 A1 * | 1/2012 | Mashtizadeh et al. | ............ | 711/6 |

OTHER PUBLICATIONS

Seanodes (Shared Internal Storage: An Introduction); 15 pages; 2007; accessed on Dec. 4, 2014 at <http://www.seanodes.com/sites/default/files/Shared%20Internal%20Storage%20-%20An%20Introduction_0.pdf>.*
"UMPC with Origami Experience 2.0", Microsoft 2008.

(Continued)

*Primary Examiner* — Keith Vicary
(74) *Attorney, Agent, or Firm* — Law Offices of Ira D. Blecker, P.C.

(57) ABSTRACT

A method and a computing device. A first computing device and a second computing device are connected, wherein the first computing device includes a first virtual machine monitor that hosts a first virtual machine. A boot image is provided on the first computing device, wherein the boot image includes a second virtual machine monitor that is adapted to host the first virtual machine. The second computing device is triggered to boot the boot image from the first computing device. A storage network is established between the first computing device and the second computing device, wherein the storage network includes storage space of the first computing device. Lastly, the first virtual machine is migrated from the first computing device to the second computing device, wherein the first virtual machine is executed by the second computing device but still located on the first virtual machine.

18 Claims, 2 Drawing Sheets

(56) References Cited

OTHER PUBLICATIONS

"Pervasive, Mobile, Wearable Computing, MetaPad", IBM, May 2005.

Elena Malykhina, "Startup Modu Launches Modular Mobile Phone", Information Week, Feb. 7, 2008.

"Pervasive, Mobile, Wearable, Computing, SoulPad", IBM, Jun. 2005.

* cited by examiner

COMPUTING DEVICE HAVING A MIGRATED VIRTUAL MACHINE ACCESSING PHYSICAL STORAGE SPACE ON ANOTHER COMPUTING DEVICE

FIELD OF THE INVENTION

The invention relates to a method and a computing device in general. In particular, the invention relates to a method and a first computing device that is enabled by use of the method to employ hardware resources of a second computing device.

BACKGROUND OF THE INVENTION

A person may not only own or may not only work on one computing device. Besides a desktop computer, a person may for example own a notebook, a personal digital assistant (PDA) or an ultra mobile personal computer (UMPC). All of these devices may store the user's data such as presentations, pictures, documents, diagrams or other files. The user of these computing devices may encounter the problem of where to search for a particular file. The user may also wish to work on his customized and individually configured desktop environment independent of the computing device he or she is actually using. The term desktop environment pertains to the user's individually configured graphical user interface that is typically provided by an operating system, e.g. Linux, UNIX, Windows XP or Windows Vista.

There are solutions available that allow keeping files on various computing devices synchronized. The obvious one is of course a synchronization tool. Besides the well known file synchronizer 'rsync', there are solutions available to synchronize user data between various PDAs, smart phones and personal computers. However, synchronization encounters the problem of detecting when one file is changed on different locations. This may also lead to the well known problem of duplication or—even worse—to loss of data, e.g. calendar entries. There are concepts available addressing the above mentioned problem to manage files on different computing devices. These concepts use a so called core device that keeps the master copy of a particular file.

MetaPad is a project presented by IBM. A MetaPad is a hardware device that fits in a frame of the size of a handheld. A MetaPad is equipped with a processor, main memory, a hard disk and an interface to connect to peripheral I/O devices. A MetaPad furthermore is equipped with a standard PC operating system. A MetaPad can be attached to several shelves to provide the functionality of a PDA, a laptop or a desktop computer. A MetaPad is however limited to its own processor and cannot make use of the possibly better processor power of a laptop or a PC even when it is used in a docking station through which it can make use of the laptop's monitor and keyboard.

SoulPad is a portable storage device. The storage device contains a software stack and enables a user to suspend his computing environment on one PC and resume it at another PC that he or she may have never seen before. The PC boots an auto-configuring operating system from the SoulPad software stack, starts a virtual machine monitor provided by the software stack, and resumes a suspended virtual machine that has the user's entire personal computing environment which includes the user's file, the user's operating system, installed applications, desktop configuration as well as all running applications and open windows (all included in the software stack). SoulPad enables a user to hibernate a PC session to a pocket form-factor device, e.g. a USB-stick, and carry the device to another PC and resume his session on that PC. Furthermore, SoulPad uses an encrypted file system since it is possible that the user may lose his SoulPad. A SoulPad alone is however not a mobile solution as it is only a storage device and can therefore not be used without another computing device.

The ultra mobile PC (UMPC), previously known by its codename project Origami, is a specification for a small form-factor tablet PC. A UMPC is however limited to its own processor. Even if it is used in a docking station in combination with peripheral devices of a desktop computer, it has the same processing power as it has on the go.

It is an objective of the invention to provide a method which allows a computing device to make use of the processing power of another computing device. Furthermore, it is an object of the invention to provide a corresponding computing device that is also able to make use of the processing power of another computing device.

BRIEF SUMMARY OF THE INVENTION

According to a first aspect of the invention a method is disclosed. In accordance with an embodiment of the invention, a connection is established between a first computing device and a second computing device. The first computing device comprises a first virtual machine monitor. The first virtual machine monitor is adapted to host a first virtual machine. The first computing device furthermore provides a boot image. The boot image comprises a second virtual machine monitor, wherein the second virtual machine monitor is adapted to host the first virtual machine. According to a further step of the method in accordance with the invention, the second computing device is triggered to boot the boot image from the first device and a storage network is established between the first computing device and the second computing device so that the storage network comprises storage space of the first computing device. Furthermore, the first virtual machine is migrated from the first computing device to the second computing device and hosted by the second virtual machine monitor that has been received by the second computing device from booting the boot image. Due to the storage network, the first virtual machine is further able to access the storage space of the first computing device but to make use of the hardware resources of the second computing device, in particular to make use of the possible better processing power of the processor of the second computing device.

A virtual machine monitor (VMM) is a virtualization platform that is able to host and to run one or more virtual machines (VMs) on a host computer system. A virtual machine monitor is also known as a hypervisor. A virtual machine is a software implementation of a machine, a computer or the like, that executes programs like a real machine. A virtual machine might provide a complete system platform which supports the execution of a complete operating system (OS). Virtual machines allow sharing the underlying physical machine resources between different virtual machines, each running its own operating system. The software layer providing the virtualization is the virtual machine monitor or hypervisor which can thus, as already mentioned above, host several virtual machines each with its own operating system and other applications running on the operating system. The operating systems executed by the virtual machines are also frequently referred to as guest operating systems.

The first virtual machine might contain the user's preferred operating system and user applications that are migrated with the first virtual machine to the second computing device to be executed by this device while they are physically still located on the first computing device. The user is therefore enabled to use its customized and individually configured desktop environment in combination with peripherals, e.g. the keyboard, screen, and mouse, of the second computing device. Moreover, the first virtual machine is executed by the second computing device which might provide better processor performance than the first device. Although the first virtual machine is executed by the second computing device, the first virtual machine is enabled to access via the storage network the same storage as when being executed on the first computing device. There is no need for the user to keep any data synchronized as all of the user's data is kept on the first computing device and no data must be duplicated.

As mentioned above, the first virtual machine monitor is adapted to host the first virtual machine. When the first virtual machine is migrated from the first computing device to the second computing device, the first virtual machine monitor needs not to host the first virtual machine. The first virtual machine can be migrated without being actually hosted by the first virtual machine monitor. The migration step includes then the following steps that are performed by the second computing device: The computer readable program code which relates to the first virtual machine and which is stored on the storage space of the first computing device is accessed via the storage network. The execution of the first virtual machine is then started on the second virtual machine monitor and the first virtual machine has then successfully been migrated to the second computing device. The second computing device may be triggered for example by the second virtual machine to perform the previously mentioned steps.

In accordance with an embodiment of the invention, the first virtual machine is hosted by the first virtual machine monitor and then migrated from the first computing device to the second computing device by use of the so called live migration technique. The first virtual machine which is running on the first computing device is paused. The used main memory of the virtual machine running on the first computing device is then copied to the second computing device. Then, the second computing device resumes the execution of the first virtual machine. This process may take under a second for completion.

Despite the migration of the first virtual machine to the second computing device, the first virtual machine remains stored on the first mobile device. It is only executed by the second computing device and it can make use of the peripheral devices of the second computing devices such as the monitor for visual output and such as the keyboard and mouse of the second computing device for the reception of input. After the migration process is completed, the user can thus continue or start working on the second computing device which is usually equipped with better, faster or more powerful hardware. Any changes performed while working on the virtual machine, for example the creation of a document, can be stored on the storage space of the first mobile device owing to the storage network established between the first and second computing device. Read or write operations performed by the main operating system executed in the first virtual machine are actually performed on the storage space of the first computing device.

In accordance with an embodiment of the invention, the boot image provided by the first computing device to the second computing device includes a second virtual machine monitor. The second virtual machine monitor is adapted to host the second virtual machine and the second virtual machine is adapted to set up the storage network between the first computing device and the second computing device when the second virtual machine is run on the second computing device.

In accordance with an embodiment of the invention, the first virtual machine monitor of the first computing device hosts a third virtual machine, wherein the third virtual machine is further adapted to set up the storage network through an interplay with the second virtual machine when the third virtual machine is run on the first computing device. The second virtual machine provides an operating system and applications that can be used to manage the second virtual machine monitor and the underlying hardware that corresponds to the second computing device while the third virtual machine provides an operating system and applications that can be used to manage the first virtual machine monitor and the underlying hardware that relates to the first computing device. The second virtual machine and the third virtual machine can be regarded as administrative virtual machines. For setting up the storage network between the first and second computing device, the second and third virtual machines might further comprise so called storage area daemons that set up the storage network. The term 'daemon' relates to a computer program that runs in the background rather than under the direct control of the user.

In accordance with an embodiment of the invention, the first virtual machine is adapted to adjust the amount of hardware resources it is employing on the second computing device. Moreover, the first virtual machine might provide an interface through which the user can adjust the amount of hardware resources employed on the second computing device.

In accordance with an embodiment of the invention, the first virtual machine is migrated back from the second computing device to the first computing device in response to the reception of a user command provided by a user to undo the connection between the first computing device and the second computing device. Furthermore, the storage network between the first computing device and the second computing device is released. The migration process of the first virtual machine from the second computing device to the first computing device can also be done via the so called live migration technique as described above so that finally the first virtual machine is executed again by the first computing device. It can be signaled, for example via the first computing device, that the migration process is completed and that the storage network is released to the user so that she or he may then disconnect the first computing device and the second computing device.

In accordance with an embodiment of the invention, information about the hardware resources available on the first computing device are provided to the first virtual machine prior to the migration of the first virtual machine from the second computing device to the first computing device. The first virtual machine is then adapted according to the provided information prior to the migration of the first virtual machine from the second mobile device to the first mobile device so that it is ensured that the first virtual machine can be executed by the first computing device.

In accordance with an embodiment of the invention, the storage network relates to a storage area network (SAN). The term storage network is however by no means to be interpreted as being limited to a storage area network. The term storage network is to be understood in a more general sense and relates to any connection between the first and second computing device that enables the second computing device to access the storage space of the first computing device.

In accordance with an embodiment of the invention, the first virtual machine monitor and the second virtual machine monitor are identical. Thus, the same virtual machine monitor is run on the first computing device and on the second computing device. This is particularly advantageous as the first virtual machine can be easily migrated between different systems running the same virtual machine monitor.

In accordance with an embodiment of the invention, the at least first computing device is a mobile computing device, for example a laptop, a PDA or the like.

In accordance with an embodiment of the invention, the second computing device provides better processor performance than the first computing device. The second computing device can also be a portable computing device, a work station, a desktop computer or the like. The second computing device can be a device on which no extra installations must be done as the first computing device provides all the necessary software to migrate the virtual machines from the first to the second computing system. The second computing device can for example be a device with which the first computing device has never interacted before.

According to a second aspect of the invention, there is provided a computing device. In accordance with an embodiment of the invention, the computing device is a first computing device and has a first virtual machine monitor. The first virtual machine is adapted to host a first virtual machine and comprises a component for connecting the first computing device to a second computing device. The first computing device comprises furthermore a component for providing a boot image to the second computing device. The boot image comprises a second virtual machine monitor which is able to host the first virtual machine. The first computing device has furthermore a component for triggering the second device to boot the boot image from the first device and a component for establishing a storage network such as a storage area network between the first computing device and the second computing device, wherein the storage network comprises storage space of the first computing device. The first computing device furthermore includes a component for a migration of the first virtual machine from the first computing device to the second computing device. The second virtual machine monitor of the second computing device hosts then the first virtual machine and enables the first virtual machine to access the storage space of the first computing device via the storage area when the first virtual machine is executed on the second computing device.

In accordance with an embodiment of the invention, the first computing device comprises means for performing the method in accordance with the invention.

According to a third aspect of the invention, a computer program product is disclosed which comprises a computer usable medium including a computer readable program. The computer readable program causes the first computing device and/or the second computing device to perform steps according to the method in accordance with the invention when the computer readable program is executed for example within a virtual machine by the first and/or second computing device.

BRIEF DESCRIPTION OF THE DRAWINGS

The following embodiments of the invention will be described in more detail by way of example only making reference to the drawings in which.

DETAILED DESCRIPTION

Figure 1:
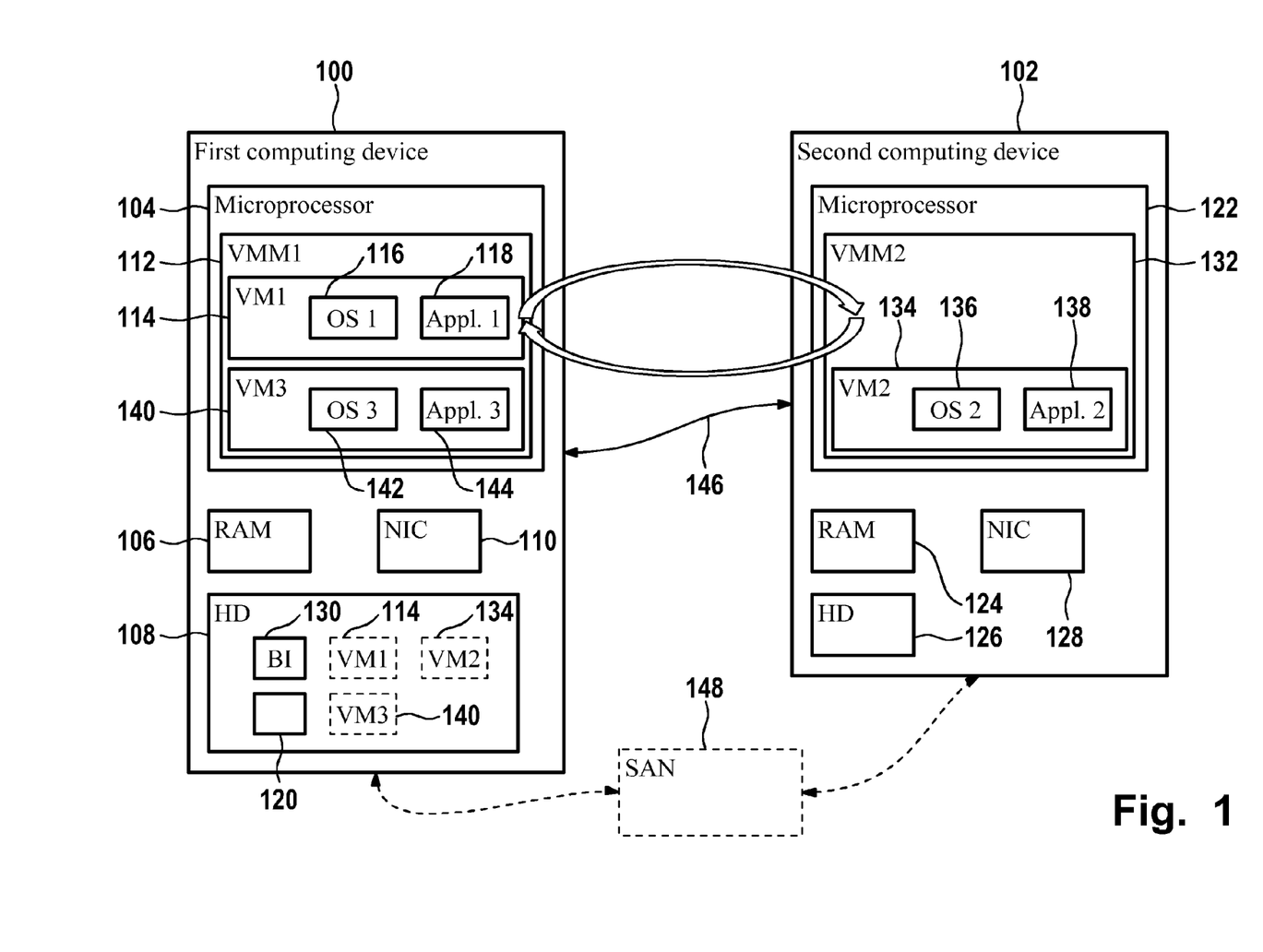
FIG. 1 shows a block diagram of a first computing device and a second computing device connected with each other according to a method in accordance with the invention.

FIG. 1 shows a block diagram of a first computing device 100 and a second computing device 102. The first computing device 100 can for example be a mobile computing device such as a laptop and the second computing device 102 can for example be a desktop computer. Initially, the first computing device 100 and the second computing device 102 are disconnected from each other.

The first computing device comprises a microprocessor 104, main memory 106, a hard disk 108 and a network interface controller (NIC) 110.

The main memory 106 is the memory which is directly accessible by the processor 104 while the hard disk 108 is a non-volatile storage medium. The network interface controller 110 can be of the form of a network card that is installed inside the first computing device 100 or it may refer to an embedded component as part of the computer's motherboard or a USB device.

The microprocessor 104 executes a first virtual machine monitor 112. The first virtual machine monitor 112 is a virtualization platform that can host one or more virtual machines. The first virtual machine monitor 112 is provided in the form of software and thus includes a processor readable program that is permanently stored on the hard disk 108 and loaded for execution in the microprocessor 104 and in the main memory 106. The virtual machine monitor 112 hosts a first virtual machine 114. The first virtual machine 114 is also a piece of software code stored on the hard disk 118 and loaded for execution into the microprocessor 104. It is therefore indicated in FIG. 1 by the dashed rectangle 114 that the first virtual machine is also stored on the hard disk 108. The first virtual machine 114 executes a first operating system 116 and first applications 118. The first operating system 116 might be the preferred operating system of the user of the first computing device and the first applications 118 can be the user's applications he or she uses frequently. Thus, the first virtual machine 114 might be a virtualization of the user's customized computer system and its desktop environment.

The first applications 118 store files 120 on the hard disk 108. The files 120 relate to the user's files that might be updated and manipulated by the user via the applications 118.

The second computing device 102 comprises a microprocessor 122, main memory 124, a hard disk 126 and a network interface controller 128. The main memory 124 can be a volatile memory that is directly accessible by the microprocessor 122 while the hard disk 126 can be a non-volatile memory device. The network interface controller 128 provides the same functionality as the network interface controller 110 of the second computing device.

The first computing device 100 can for example be connected to a local area network (LAN) via the network interface controller 110 to which the second computing device 102 can also be connected via the network interface controller 128. The first computing device 100 provides a boot image 130 on its hard disk 108. The boot image 130 comprises a second virtual machine monitor 132 and a second virtual machine 134 comprising a second operating system 136 and second applications 138. The second virtual machine 134 is an administrative virtual machine and is used to administrate the second virtual machine monitor 132. It is to be pointed out that the second virtual machine monitor 132, the second virtual machine 134 including the second operating system 136 and the second applications 138 are comprised in the boot image 130 and thus stored on the hard disk 108. As these software components will however be employed by the microprocessor 122 of the second computing device 102, these components are depicted in FIG. 1 within the microprocessor 122 in anticipation of this situation. However, as the second virtual machine 134 is also stored on the hard disk 108 as pointed out above, a dashed rectangle is shown within the symbol for the hard disk 108 in FIG. 1.

The first virtual machine monitor 112 further hosts a third virtual machine 140 comprising a third operating system 142 and third applications 144. The third virtual machine 140 is also stored on the hard disk 108 as indicated by the corresponding dashed rectangle. The third virtual machine 140 is an administrative virtual machine and used to administrate the virtual machine monitor 112 and the underlying first computing device. The first, second and third operating systems 116, 136, and 142, respectively, may be operating systems of the same type or may be of different type. Furthermore, the second virtual machine monitor 132 is able to host the first virtual machine 114 and may even correspond to the first virtual machine 114.

After the first computing device 100 and the second computing device 102 have been connected, for example as mentioned above over the LAN, a network connection 146 is established between the first computing device 100 and the second computing device 102.

The first computing device 100 might for example via the third virtual machine 140 trigger the second computing device 102 to boot the boot image 130. For example, the second computing device 102 can be switched on by the first computing device 100 through the use of wake-on-LAN (WoL).

Once the second computing device 102 has booted the boot image 130, the microprocessor 122 executes the second virtual machine monitor 132 with the second virtual machine 134 and associated operating system 136 and second applications 138. The second computing device 102 and more particularly the second virtual machine monitor 132 is further able to host the first virtual machine 114. As already mentioned above, the second virtual machine 134 is also an administrative virtual machine and provides for example through an application of the applications 138 the feature to set up a storage area network 148 between the first and second computing devices for example via interaction with a corresponding application of the third applications 144. These applications might for example be daemons that are adapted to set up the storage area network 148.

The storage area network 148 can be regarded as a logical storage space that comprises the storage space provided by the hard disk 108. Due to the storage area network 148 comprising the hard disk 108, the second virtual machine monitor 132 is able to access also the virtual machines stored on the hard disk 108 and thus is able to access the first virtual machine 114 while this machine remains located on the first computing device 100. The first virtual machine 114 is then live migrated, for example initiated via a process run on the third virtual machine 140 from the first computing device 100 to the second computing device 102 and more particularly to the second virtual machine monitor 132 as indicated by the arrow pointing from the first virtual machine monitor 112 to the second virtual machine monitor 132. The first virtual machine 114 is thus executed by the second computing device while it is still located on hard disk 108. The user of the first and second computing devices 100, 102 is thus able to use the first virtual machine 114 and its customized desktop environment provided by the first operating system 116 and the first applications 118 on the second computing device 102 which might provide superior processor performance and more ergonomic input devices, e.g a more ergonomic keyboard and a better screen, while the user's data remains stored and is updated or amended in the files. The user is therefore enabled by the method in accordance with the invention to connect his mobile first computing device 100 to the second computing device 102 and to work on his customized desktop environment while the data he is changing or generating is stored on his first computing device 100 so that the user will not have to face any synchronization problems.

In order to transfer the first virtual machine 114 back to the first computing device 100, the user provides a corresponding command, wherein in response the first virtual machine 114 is live migrated back to the first computing device 100 as indicated by the second arrow in FIG. 1. When the migration of the virtual machine 114 to the first computing device 100 is completed, the storage area network 148 is released. Live migration includes the step of pausing the first virtual machine 114 on the microprocessor 122, the steps of taking a snapshot of the main memory of the first virtual machine located on 124 and of copying the snapshot to the main memory 106 of the first computing device 100 for example over the connection 146. Finally, execution of the first virtual machine 114 is resumed by the first computing device 100. The process of live migration can be performed relatively fast, for example in less than a second.

In an alternative embodiment, the first virtual machine monitor 112 may not actually host the first virtual machine 114. Migration of the first virtual machine 114 from the first computing device 100 to the second computing device 102 includes then the step of triggering the second virtual machine monitor 132 that is run on the second computing device 102 to access the hard disk 108 of the first computing device via the SAN 148, to read the program code of the first virtual machine 114 and to start hosting the first virtual machine 114. This might be convenient and time-saving in the case when the user starts up his first and second computing devices 100, 102 more or less simultaneously because the time for starting up the first virtual machine 114 within the first virtual machine monitor 112 can be saved. The first virtual machine 114 can then be migrated back from the second computing device 102 to the first virtual machine monitor 112 by use of live migration as described above. Alternatively, the second computing device 102 can in response to a corresponding user command shut down the second virtual machine monitor 132 along with the first virtual machine 114 and the second virtual machine 134. This might be the user's preferred option when the user does not want to continue working on the first computing device 100 after leaving the second computing device 102.

Figure 2:
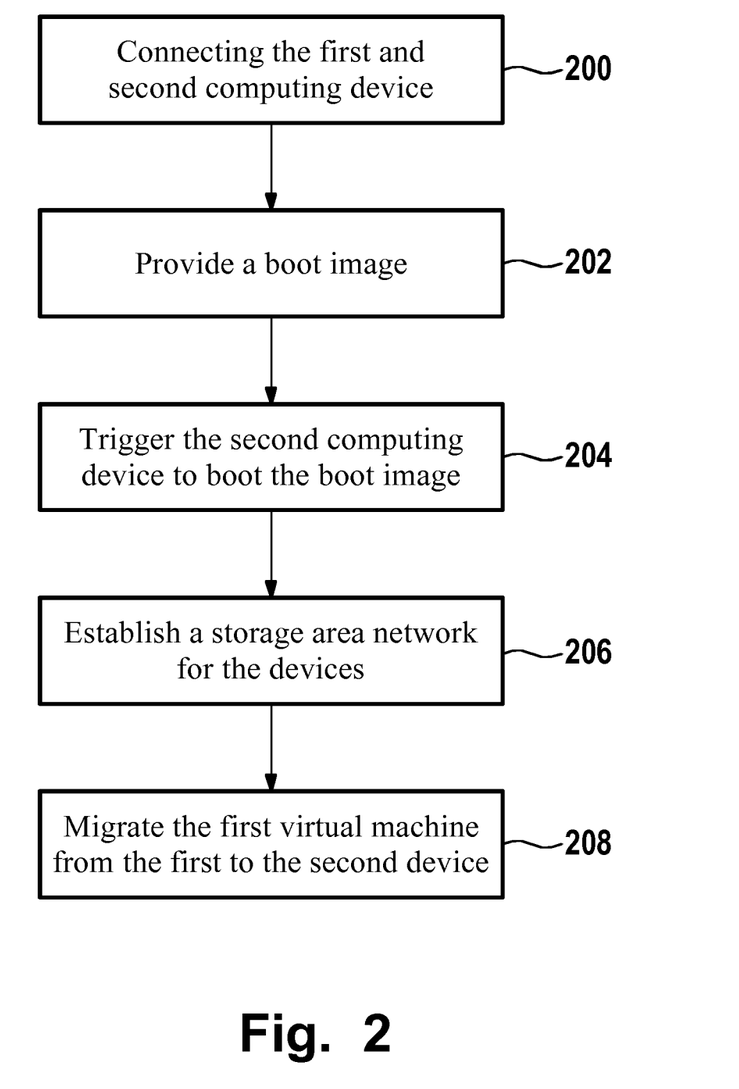
FIG. 2 shows a flow diagram illustrating steps of a method in accordance with the invention.

FIG. 2 shows a flow diagram that illustrates steps of a method in accordance with the invention. According to step 200, the first and second computing devices are connected with each other, wherein the first computing device comprises a first virtual machine monitor that hosts a first virtual machine. According to step 202, a boot image is provided on the first computing device, wherein the boot image comprises a second virtual machine monitor that is adapted to host the first virtual machine. According to step 204 of the method, the second computing device is triggered to boot the boot image from the first device. According to step 206, a storage network is established between the first computing device and the second computing device, wherein the storage network comprises storage space of the first computing device. Furthermore, according to step 208 of the method in accordance with the invention, the first virtual machine is migrated from the first computing device to the second computing device, wherein the first virtual machine is hosted by the second virtual machine monitor that is received by the second computing device from booting the boot image, and wherein the first virtual machine is enabled via the storage network to access the storage space of the first computing device.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

While the foregoing has been with reference to particular embodiments of the invention, it will be appreciated by those skilled in the art that changes in these embodiments may be made without departing from the principles and spirit of the invention, the scope of which is defined by the appended claims.

LIST OF REFERENCE NUMERALS 100 first computing device
102 second computing device
104 microprocessor
106 main memory
108 hard disk
110 network interface controller
112 first virtual machine monitor
114 first virtual machine
116 first operating system
118 first applications
120 files
122 microprocessor
124 main memory
126 hard disk
128 network interface controller
130 boot image
132 second virtual machine monitor
134 second virtual machine
136 second operating system
138 second applications
140 third virtual machine
142 third operating system
144 third applications
146 network connection
148 storage area network

The invention claimed is:

1. A method comprising the steps of:
providing a connection between a first computing device and a second computing device, the first computing device comprising a first virtual machine monitor, the first virtual machine monitor being adapted to host a first virtual machine;
providing a boot image on the first computing device, the boot image comprising a second virtual machine monitor, the second virtual machine monitor being adapted to host the first virtual machine, wherein the boot image further includes a second virtual machine, wherein the second virtual machine monitor is adapted to host the second virtual machine;
triggering the second computing device to boot the boot image from the first computing device;
establishing a storage network between the first computing device and the second computing device, the storage network comprising logical storage networked between the first computing device and the second computing device and physical nonvolatile storage space on the first computing device, the physical nonvolatile storage space storing all nonvolatile data as between the first computing device and second computing device such that there is no duplication of the nonvolatile data between the first computing device and the second computing device, wherein the second virtual machine is adapted to set up the storage network that (i) enables changes to the nonvolatile data on the physical nonvolatile storage space on the first computing device when the second virtual machine is run on the second computing device and (ii) stores such changes to the nonvolatile data on the physical nonvolatile storage space on the first computing device when the second virtual machine is run on the second computing device; and
migrating, by the first computing device, the first virtual machine from the first computing device to the second computing device, wherein the first virtual machine is hosted by the second virtual machine monitor, wherein the migrated first virtual machine is configured via the storage network while the migrated first virtual machine is fully migrated to the second computing device to access the physical nonvolatile storage space on the first computing device, perform changes to the nonvolatile data on the physical nonvolatile storage space on the first computing device, and store on the physical nonvolatile storage space on the first computing device such changes to the nonvolatile data on the physical nonvolatile storage space on the first computing device.

2. The method of claim 1, wherein the first virtual machine is migrated from the first computing device to the second computing device by use of a live migration technique if the first virtual machine is hosted by the first virtual machine monitor on the first computing device.

3. The method of claim 1, wherein the first virtual machine includes a main operating system, wherein the main operating system is executed by the second computing device while the first virtual machine is fully migrated to the second computing device, wherein read and write operations of the main operating system executed by the second computing device while the first virtual machine is fully migrated to the second computing device are performed on the physical nonvolatile storage space of the first computing device via the storage network and wherein the main operating system and the read and write operations are all executed at the same time while the first virtual machine is fully migrated to the second computing device.

4. The method of claim 3, wherein the first virtual machine further comprises user applications, wherein the main operating system is adapted to execute one or more of the user applications when the first virtual machine is migrated to the second computing device, wherein a user is enabled to use the main operating system and the user applications on the second computing device.

5. The method of claim 4, wherein the main operating system and the user applications relate to a customized user environment of the user on the first computing device, wherein the customized user environment is migrated due to the migration of the first virtual machine to the second computing device, wherein hardware resources of the second computing device are employed, wherein the physical nonvolatile storage space on the first computing device is employed for accessing and for updating the data files of the user by the first virtual machine on the physical nonvolatile storage space on the first computing device when the first virtual machine is fully migrated to the second computing device.

6. The method of claim 1, wherein the first virtual machine monitor of the first computing device hosts a third virtual machine, wherein the third virtual machine is further adapted to set up the storage network through an interplay with the second virtual machine when the third virtual machine is run on the first computing device.

7. The method of claim 1, wherein the first virtual machine is adapted to adjust the amount of hardware resources employed on the second computing device.

8. The method of claim 1, further comprising:
migrating the first virtual machine back from the second computing device to the first computing device in response to reception of a user command; and
releasing the storage network between the first computing device and the second computing device.

9. The method of claim 8, further comprising signaling to the user that the first computing device and the second computing device can be disconnected from each other.

10. The method of claim 8, further comprising:
providing information about hardware resources of the first computing device to the first virtual machine prior to the migrating the first virtual machine back from the second computing device to the first computing device; and
adjusting the first virtual machine according to the provided information prior to the migrating the first virtual machine back from the second computing device to the first computing device, thereby ensuring that the first virtual machine will be executable by the first computing device, and wherein the first virtual machine is re-migrated from the second computing device to the first computing device by use of a live migration technique.

11. The method of claim 1, wherein the storage network is a storage area network (SAN).

12. The method of claim 1, wherein at least the first computing device is a mobile computing device, wherein the second computing device provides better processor performance than the first computing device.

13. A computing device, the computing device being a first computing device comprising:
at least one computer processor;
a nonvolatile storage medium coupled to the at least one computer processor, the nonvolatile storage medium comprising a physical nonvolatile storage space on the first computing device;
a first virtual machine monitor for hosting a first virtual machine;
a component for connecting the first computing device to a second computing device;
a component for providing a boot image to the second computing device, the boot image comprising a second virtual machine monitor, wherein the second virtual machine monitor is able to host the first virtual machine, wherein the boot image further includes a second virtual machine, wherein the second virtual machine is adapted to be hosted by the second virtual machine monitor, wherein the first virtual machine monitor further comprises a third virtual machine;
a component for triggering the second computing device to boot the boot image from the first computing device;
a component for establishing a storage network between the first computing device and the second computing device, wherein the storage network comprises logical storage networked between the first computing device and the second computing device and the physical nonvolatile storage space on the first computing device, the physical nonvolatile storage space storing all nonvolatile data as between the first computing device and second computing device such that there is no duplication of the nonvolatile data between the first computing device and the second computing device, wherein the second virtual machine and the third virtual machine are adapted to set up the storage network that (i) performs changes to the nonvolatile data on the physical nonvolatile storage space on the first computing device when the second virtual machine is run on the second computing device and when the third virtual machine is run on the first computing device and (ii) stores such changes on the physical nonvolatile storage space on the first computing device when the second virtual machine is run on the second computing device and when the third virtual machine is run on the first computing device; and
a component for migrating the first virtual machine from the first computing device to the second computing device, when the second virtual machine monitor is hosted by the second computing device, wherein the storage network is adapted to provide access for the migrated first virtual machine to the physical nonvolatile storage space on the first computing device, the migrated first virtual machine is configured while the migrated first virtual machine is fully migrated to the second computing device to perform changes to the nonvolatile data on the physical nonvolatile storage space on the first computing device and the migrated first virtual machine stores such changes to the nonvolatile data on the physical nonvolatile storage space on the first computing device.

14. The computing device of claim 13, comprising:
a component for migrating the first virtual machine back from the second computing device to the first computing device in response to reception of a user command; and
a component for releasing the storage network between the first computing device and the second computing device.

15. A computer program product comprising a non-transitory computer useable medium including a computer readable program, wherein the computer readable program when executed on a first computing device causes the first computing device to:
- trigger a second computing device to boot a boot image from the first computing device, wherein the first computing device comprises a first virtual machine monitor for hosting a first virtual machine, wherein the boot image comprises a second virtual machine monitor, wherein the second virtual machine monitor is adapted to host the first virtual machine, wherein the boot image further includes a second virtual machine, wherein the second virtual machine monitor is adapted to host the second virtual machine;
- establish a storage network between the first computing device and the second computing device, wherein the storage network includes logical storage networked between the first computing device and the second computing device and physical nonvolatile storage space on the first computing device, the physical nonvolatile storage space storing all nonvolatile data as between the first computing device and second computing device such that there is no duplication of the nonvolatile data between the first computing device and second computing device, wherein the second virtual machine is adapted to set up the storage network that (i) enables changes to the nonvolatile data on the physical nonvolatile storage space on the first computing device when the second virtual machine is run on the second computing device and (ii) stores such changes to the nonvolatile data on the physical nonvolatile storage space on the first computing device when the second virtual machine is run on the second computing device; and
- migrate the first virtual machine from the first computing device to the second computing device wherein the migrated first virtual machine is configured via the storage network while the migrated first virtual machine is fully migrated to the second computing device for accessing the physical nonvolatile storage space on the first computing device, performing changes to the nonvolatile data on the physical nonvolatile storage space on the first computing device and storing such changes on the physical nonvolatile storage space on the first computing device.

16. The computer program product of claim 15, wherein the migrated first virtual machine hosts a main operating system and user applications, wherein the computer readable program causes the migrated first virtual machine to perform read and write operations of the main operating system on the physical nonvolatile storage space on the first computer device or perform read and write operations of the user applications on the physical nonvolatile storage space on the first computer device while the migrated first virtual machine is fully migrated to the second computing device.

17. The computer program product of claim 15, wherein the computer readable program when executed on the first computer device further causing the first computing device to:
- migrate the first virtual machine from the second computing device back to the first computing device in response to reception of a user command provided by a user to undo a connection between the first computing device and the second computing device; and
- release the storage network between the first computing device and the second computing device.

18. The computer program product of claim 17, wherein the computer readable program when executed on the first computer device further causing the first computing device to:
- provide information about hardware resources of the first computing device to the first virtual machine prior to the migration of the first virtual machine from the second computing device back to the first computing device; and
- adjust the first virtual machine according to the provided information prior to the migration of the first virtual machine from the second computing device back to the first computing device, thereby ensuring that the first virtual machine will be executable by the first computing device, and wherein the first virtual machine is re-migrated from the second computing device to the first computing device by use of a live migration technique.

* * * * *